United States Patent Office 3,572,114
Patented Mar. 23, 1971

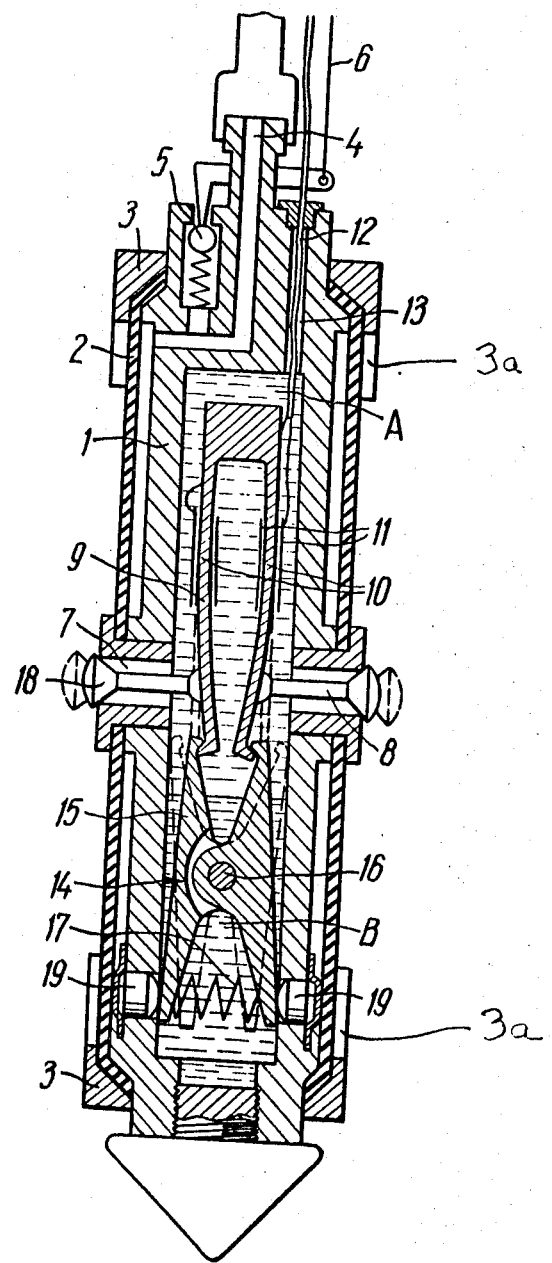

3,572,114
DEVICE FOR EVALUATING DEFORMATION CHARACTERISTICS OF ROCKS IN SITU
Konstantin Vladimirovich Ruppeneit, Tovarischesky per. 8, kv. 8; Evgeny Semenovich Prigozhin, Ul. Glagoleva 24, korp. 2, kv. 14; and Jury Rodionovich Perkov, Sportivnaya ul. 6, kv. 2, all of Moscow, U.S.S.R.
Filed Aug. 12, 1968, Ser. No. 751,779
Int. Cl. E21b 49/00
U.S. Cl. 73—151                                  3 Claims

ABSTRACT OF THE DISCLOSURE

A device for measuring deformation characteristics or rocks is inserted into a bore hole therein and a fluid medium under pressure is introduced between a body of the device and a surrounding envelope to pressurize the walls of the bore holes. A feeler is extended from the body to contact the wall of the bore to follow its deformation under the action of the fluid medium and a measuring device is coupled to the feeler to measure its displacement. The measuring device is released by grips when measurement is being made so as to be floating in a chamber in the body and suspended by the feeler from the wall of the bore hole. The chamber is filled with a dielectric liquid lighter than water and the measuring device is in the upper portion of the chamber and above an aperture in which the feeler travels so that if water enters the chamber through the aperture, the measuring device will remain protected by the dielectric liquid.

---

This invention relates to improvements in devices for evaluating the deformation characteristics of rocks in situ, as disclosed in U.S. Pat. No. 3,466,926.

It is an object of the invention to provide a device for evaluating the deformation characteristics of rocks in situ by contacting telescopic feelers of the device with the walls of a bore hole sunk in the rocks under examination, the feelers being connected to an arrangement that measures the displacement of the bore hole walls under the effect of the pressure of a fluid medium (liquid or gas) pumped under an elastic envelope surrounding the device body. The arrangement is comprised of a frame constituted of elastic plates having strain gauges cemented thereon. The strain gauges are interconnected so as to form a bridge circuit which is electrically coupled to recording instruments disposed outside the bore hole. The body of the device houses grips that hold the measuring arrangement in place and bring it out of contact with the body while the measurements are being made, thus obtaining the effect of a floating-type suspension. The measurement arrangement contacts via the feelers, exclusively with the walls of the bore hole, against which an outward thrust is applied.

The known devices are noted for their high accuracy of measurements.

However, experience indicates that immersing the device into a flooded bore hole results in water penetration into the body of the device and associated undesirable damage to the electrical circuit of the measuring arrangement or to the electrical connections between said arrangement and the recording instruments. These phenomena bring about a marked diminution of the accuracy of measurements or preclude the measurements altogether.

It is an object of the present invention to provide an improvement of the known device which makes it possible to protect the measuring arrangement and connections thereof to the recording instruments from the deleterious effects of water in the bore holes without impairing the floating-type mounting of the measuring arrangement in the course of measurements.

According to the invention, there is provided a device for evaluating the deformation characteristics of rocks in situ by contacting the telescopic feelers of the device with the walls of a bore hole in the rock formation under examination, wherein the feelers are connected to an arrangement that measures the displacement of the bore hole walls under the effect of the pressure of a fluid medium pumped under an elastic envelope surrounding the body of the device, and the device body houses grips that hold in place the measuring arrangement and bring it out of contact with the device body during measurements. An improvement, according to the invention, consists in the arrangement wherein the space within the body of the device, which accommodates the measuring arrangement, is filled with a dielectric liquid, e.g., transformer oil, whose specific gravity is less than that of water.

Where water penetrates inside the device body from the bore hole, water pressure causes the oil which is lighter than water to be collected in the upper portion of the device and, if said device is disposed vertically, the measuring arrangement will be surrounded by a protective medium.

The invention is described hereinbelow in connection with an exemplary embodiment of a device thereof and with reference to the accompanying drawing the sole figure of which is a diagrammatic longitudinal cross-section through the device.

Around the body 1 of the device there is placed an elastic envelope 2 mounted on body 1 by means of collets 3 of a thrust device.

With the device sunk into a bore hole, the thrust effect against the bore hole walls is produced by pumping a liquid or gas, via conduit 4 in the body 1, under the elastic envelope 2. When it is desired to lift the device from the bore hole, use is made of cable 6 actuated from the surface to open a relief valve 5 and release liquid or gas pressure in the envelope 2.

In the body 1 and the envelope 2, provision is made for orifices 7, through which orifices pass telescopic contact feelers 8 connected to an arrangement 9 for measuring the displacement of the walls of a bore hole due to the pressure of liquid or gas in the envelope 2.

The measuring arrangement 9 is comprised of elastic plates 10 with strain gauges 11 cemented thereonto and interconnected so as to form a bridge circuit, leads 12 placed in a conduit 13 of the device body 1 serving to couple the bridge circuit to recording instruments disposed near the well head.

The plates 10 constitute an elastic frame and carry the feelers 8 fixed thereto opposite the orifices 7 in the body 1. The inner chamber of the body 1 with the masuring arrangement 9 disposed therin is filled with dielectric liquid A, e.g., transformer oil, whose specific gravity is less than that of water. To fill the chamber of the body 1 with the liquid, provision is made for conduit 13 having a shut-off valve at the inlet end.

When inoperative, the measuring arrangement 9 contacts the body 1 via grips 14 whose levers 15 are rotatable about an axle 16 and, upon being thrust apart by a spring 17, exert pressure on the plates 10, whereupon said plates undergo elastic deflection and causes the feelers 8 to retract into the body 1.

The retraction of feelers 8 results in closing the orifices 7 by the feeler tips 18, thereby preventing the flow of dielectric liquid A from the body 1. After installing the device in a vertical or inclined bore hole, a fluid medium is pumped, via the conduit 4, under the envelope 2. Due to the pressure of the fluid medium, the envelope 2 inflates and presses the sloted edges 3a of the collet into abutment with the walls of the bore hole so that the device is held in place and thrust is exerted on the walls of the bore hole.

Simultaneously, the levers 15 of the grips 14 automatically release the measuring arrangement 9 due to the fact that the fluid medium acts upon pistons 19 mounted in the device body 1, whereupon said pistons are displaced and contact the ends of the levers 15, thereby compressing the spring 17 and allowing the plates 10 of the measuring device 9 to resume their unstrained position with concomitant advancement of the feelers 8 through the orifices 7 in the body 1 until said feelers abut against walls of the bore hole. Hence, in the course of measurements, the measuring arrangement 9 will be disconnected from the body 1 and envelope 2, the only points of contact being with the walls of the bore hole where the feelers directly abut against the walls. Thus, in carrying out the measurement, the device 9 has no mechanical connection with body 1 and envelope 2 but is suspended by the feelers 8 thrust against the walls of the bore hole.

Water B which enters the body 1 through the orifice 7 will displace the light oil into the top portion of the inner chamber of the body 1 above the orifices 7 and wherein the strain gauges 11 and leads 12 are placed. Thus a protective oil reservoir will be formed around the strain gauges 11 and leads 12.

The embodiment of the present invention makes for a reliable protection of the measuring device 9 from water without incorporating into the design of the device in question any mechanical links that might interfere with the floating-type suspension of said measuring arrangement.

To effect a measurement, the device with the inner chamber filled with oil is lowered into a bore hole filled with water to the desired depth and thereafter the working fluid is delivered under envelope 2. When a preset pressuer is achieved, the grips 14 are operative and release the feelers from the body which are thrust against the walls of the bore hole. At the same time, the grips 14 release the measuring arrangement 9, eliminating its mechanical connection with the body of the device. With the device now installed, the thrust pressure of the fluid medium is increased and the feelers follow the displacement of the rock at the bore hole and this displacement is recorded by recording instruments at the well head. To carry out measurements in a dry bore hole, the same device may be used without filling its inner chamber with oil.

The present invention is in no way limited by the exemplary embodiment thereof described hereinabove and lends itself to modifications and alterations within the scope of the appended claims.

We claim:

1. A device for evaluating the deformation characteristics of rocks in situ by being inserted into a bore hole in the rocks, said device comprising a hollow body with an inner chamber, an elastic envelope on said body for being expanded under the perssure of a fluid medium introduced between the envelope and body so as to contact the walls of the bore hole and pressurize the rocks, said body having an orifice therein leading from said inner chamber to the exterior of the device, feeler means in said body for being displaced through said orifice so as to contact the walls of the bore and follow deformation thereof under the pressure applied by said fluid medium, means in said inner chamber and coupled to said feeler means for measuring displacement of the feeler means and thereby the deformation of the walls of the bore, grip means in said body for holding the measuring means in inoperative position and for releasing the measuring means from contact with the body when measurements are to be made, and a dielectric liquid filling said chamber and having a specific gravity less than water, said measuring means benig disposed in said inner chamber at a level above the orifice so that if water in the bore hole enters the inner chamber through said orifice, the measuring means will remain enveloped by a reservoir of the lighter dielectric liquid.

2. A device as claimed in claim 1 comprising means responsive to the pressure of said fluid medium for acting on said grip means to hold or release the measuring means.

3. A device as claimed in claim 1, wherein said feeler means has a retracted position when the measuring means is held by the grip means, said feeler means in said retracted position sealing said orifice.

References Cited

UNITED STATES PATENTS 2,036,458  4/1936  Carlson _____ 73—88E
3,259,990  7/1966  Key, Jr. _____ 33—178(F)

JAMES J. GILL, Primary Examiner